Figure 1:
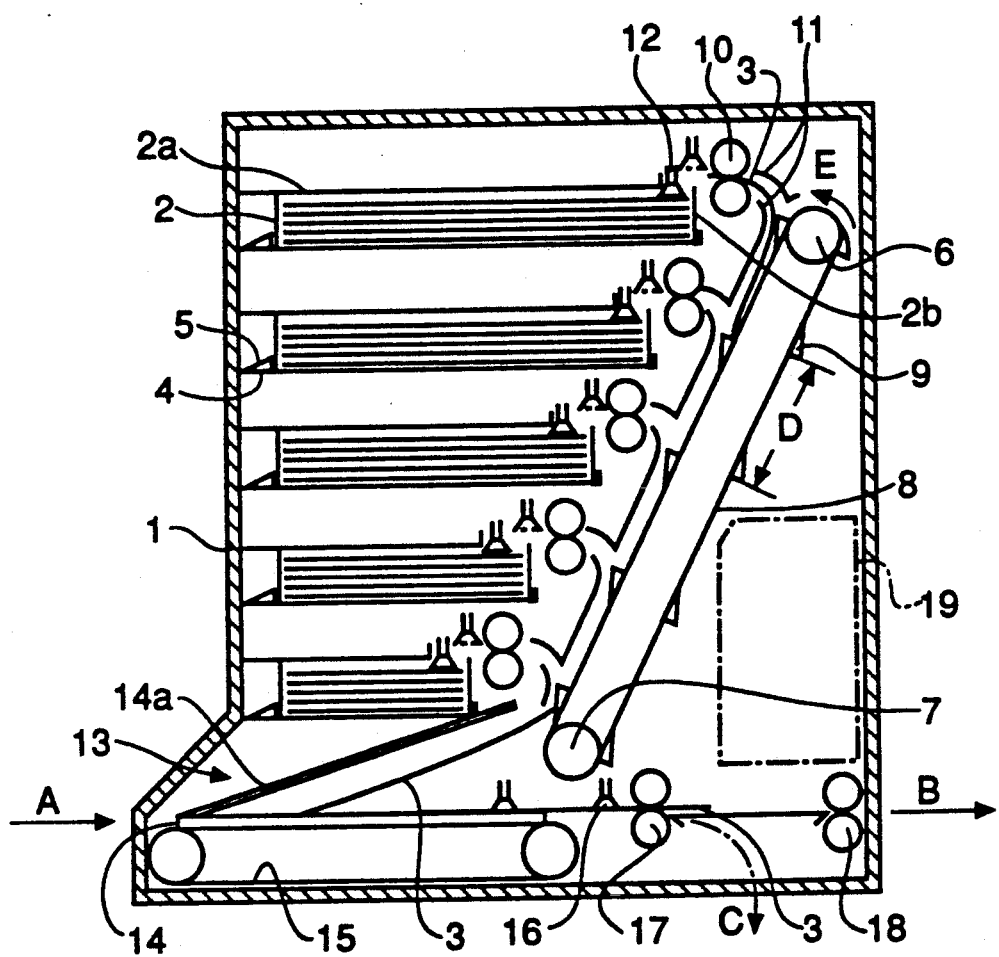

United States Patent [19]

Scheufler

[11] Patent Number: 5,294,101
[45] Date of Patent: Mar. 15, 1994

[54] AUTOMATIC FILM-LOADING DEVICE FOR SHEET FILM CASSETTES

[75] Inventor: Gert Scheufler, Winnenden, Fed. Rep. of Germany

[73] Assignee: Eastman Kodak Company, Rochester, N.Y.

[21] Appl. No.: 455,351

[22] PCT Filed: Mar. 4, 1988

[86] PCT No.: PCT/EP88/00166
  § 371 Date: Sep. 1, 1989
  § 102(e) Date: Sep. 1, 1989

[87] PCT Pub. No.: WO88/06750
  PCT Pub. Date: Sep. 7, 1988

[30] Foreign Application Priority Data

Mar. 5, 1987 [DE] Fed. Rep. of Germany ....... 3707059

[51] Int. Cl.$^5$ ............................................. B65H 3/44
[52] U.S. Cl. ............................................. 271/9; 271/12; 271/5; 271/6; 378/172; 378/173
[58] Field of Search ............... 414/331, 411; 271/9, 271/4, 5, 6, 10-13; 378/172, 173, 174; 221/130

[56] References Cited

U.S. PATENT DOCUMENTS

| | | |
|---|---|---|
| 3,150,263 | 9/1964 | Catlin . |
| 3,991,317 | 11/1976 | Kunne et al. ............ 378/173 |
| 4,049,142 | 9/1977 | Azzaroni . |
| 4,086,493 | 4/1978 | Krumrey et al. ............ 378/173 |
| 4,514,958 | 5/1985 | Hoorn ............ 414/411 |
| 4,539,794 | 9/1985 | Azzaroni ............ 414/411 |
| 4,569,586 | 2/1986 | Koyama ............ 271/9 |
| 4,889,989 | 12/1989 | Yoshimura et al. ............ 414/411 |
| 4,920,553 | 4/1990 | Sasaki et al. ............ 378/172 |

Primary Examiner—H. Grant Skaggs
Attorney, Agent, or Firm—Dana M. Schmidt

[57] ABSTRACT

In a film loading device, a plurality of supply magazines of different sizes are arranged horizontally one above the other. The removal sides of the supply magazines are staggered such that the largest supply magazine is arranged at the top of the device and each following, smaller supply magazine is staggered backwardly below. An endless conveyor belt with projections is arranged opposite to the removal sides of the supply magazines, said belt being in an inclined position corresponding to the inclination of the staggered arrangement of the magazines. The conveyor belt extends from the upper most supply magazine down to a cassette unloading and reloading station disposed below the supply magazines. At the side of the conveyor belt which faces away from the supply magazines, a drive and control device of the film-loading device is positioned. The projections on the conveyor belt are arranged, in the direction of movement of the conveyor belt, at a distance "D" which corresponds to at least the smallest of sheet film sizes to be handled.

3 Claims, 1 Drawing Sheet

AUTOMATIC FILM-LOADING DEVICE FOR SHEET FILM CASSETTES

The invention relates to a device for automatically loading a sheet film into a sheet-film cassette, said device comprising a plurality of supply magazines of different sizes arranged horizontally one above the other, a cassette-loading station arranged below the supply magazines and a sheet-film removal device associated with the sheet removal sides of the supply magazines.

In a device of this type disclosed in U.S. Pat. No. 3,150,263, supply magazines of different sizes are arranged in a horizontal position one above the other such that their removal sides are positioned vertically above each other. The sheet films removed from a supply magazine drop into vertically arranged guide channels and down into a cassette-loading station. In the case of that device, the sheet films are subjected to high falling speeds on their way towards the cassette-loading station so that undesired pressure marks can occur as a result of impact forces or the like. Moreover, considerable space is required in the area of the supply magazines because the smaller supply magazines need the same space as the larger supply magazines.

It is the object of the invention to design a device of the generic type such that in addition to the film being handled carefully and reliably, a compact space-saving shape of the apparatus is obtained.

In accordance with the invention this object is attained in that the removal sides of the supply magazines are staggered such that the largest supply magazine is arranged at the top and each following, smaller supply magazine is staggered backwardly below, in that an endless conveyor belt is positioned opposite to the removal sides of the supply magazines, said belt being in an inclined position corresponding to their staggered arrangement and extending down to the cassette-loading station and in that sheet-film guide means and/or the sheet-film removal device are arranged between the removal sides of the supply magazines and the conveyor belt.

According to an advantageous modification of the invention the conveyor belt is provided with projections which are arranged in the direction of movement thereof at a distance corresponding to at least the smallest sheet-film size to be handled.

According to another useful modification of the invention each supply magazine is associated with a sheet-film removal device and guide means which transfer a removed sheet film to the conveyor belt.

According to still another useful modification of the invention the conveyor belt is designed as a suction belt.

The device according to the invention allows in an advantageous way the sheet film to be moved in a damage-preventing manner on its way from the supply magazine to the cassette so that pressure marks caused by impact or other damage to the film caused by increased friction are avoided.

Further features and advantages can be inferred from the description of an embodiment of the invention illustrated in the drawing and from the subclaims. The drawing shows schematically a lateral sectional view of the device.

The single figure shows a device 1 for loading and unloading cassettes 14 for X-ray sheet film, said device being arranged on a work table not illustrated.

The device comprises a plurality of supply magazines 2 which are arranged horizontally one above the other and are of different sizes for different sheet-film formats and are each mounted to a pair of ledges 4.

The supply magazines 2 arranged closely side by side are provided with sliding covers 2a which are opened for sheet removal by an opening device not illustrated which is for example operated electromagnetically or pneumatically.

A plurality of sheet films of equal size is arranged in each supply magazine 2.

During their introduction into the device 1, the supply magazines 2 are moved up to an end-side abutment not illustrated in detail and are fixed in this position by a rear locking step 5.

Each of the supply magazines 2 is associated with a code not illustrated which indicates the size of the sheet film loaded and transmits the relevant data to a control device 19.

The removal sides 2b of the supply magazines 2 are staggered such that the largest supply magazine 2 is arranged right at the top and each following smaller supply magazine 2 is staggered backwardly below so that the smallest supply magazine 2 lies at the bottom of the device 1.

An endless conveyor belt 8 mounted on rollers 6 and 7 is arranged opposite to the removal sides 2b of the supply magazines 2. The conveyor belt 8 is arranged in an inclined position corresponding to the line formed by the staggered arrangement of the removal sides 2b of the supply magazines 2 and extends from the uppermost supply magazine 2 down to a cassette unloading and reloading station 13 arranged below the supply magazines.

The conveyor belt 8 has projections 9 disposed transversely to its direction of movement, said projections preventing a sheet film 3 from slipping off the belt on which they are deposited. The projections 9 are arranged, in the direction of movement of the conveyor belt 8, at a distance "D" which corresponds to at least the smallest sheet-film size to be handled.

The width of conveyor belt 8 corresponds to the width of the greatest sheet-film size to be handled.

The projections 9 may take the form of a continuous ledge or may be provided with interruptions.

The cross-section of the projections 9 is preferably wedge-shaped because this shape provides a reliable abutment edge and an inclined film sliding surface which minimizes damage to the sheet film 3.

Transport rollers 10 and guide elements 11 are arranged between each supply magazine 2 and the conveyor belt 8; they form a channel extending from the removal side 2b of the supply magazines 2 to the conveyor belt 8.

A suction bar 12 known per se and not illustrated in detail, which is arranged in the removal area of each supply magazine 2, serves to remove a sheet film 3 from the supply magazine 2. The suction bar 12 may be driven for example by a lever gear for reciprocating as well as upward and downward movement.

In the cassette unloading and reloading station 13, a cassette 14 is arranged on a transport belt 15 on which it can be moved inwardly and outwardly. The cover 14a of cassette 14 is opened and closed respectively by means of a type known per se and not illustrated.

A suction bar 16 of a type known per se, which can be moved into the open cassette 14, serves to remove a sheet film 3 from the cassette 14 and to transfer said removed sheet film to transport rollers 17. The suction bar 16 moreover serves to shift a sheet film 3 sliding into open cassette 14 into its correct position within the cassette 14.

Transport rollers 17 as well as the transport rollers 18 arranged downstream of them serve to transport an exposed sheet film 3 from the device 1 into a film developing apparatus (not illustrated) of a type known per se which is connected to the device in the direction of the arrow "B".

The inclined arrangement of the conveyor belt 8 in connection with the staggered arrangement of the supply magazines 2 results in that the film is not only protected from damage but also that the space is optimally utilized because free space becomes available at the side of the conveyor belt 8 facing away from the supply magazines 2. In this free space, a drive and control device 19 (shown in dash-dotted lines) for device 1 is arranged which is not illustrated in detail.

The drive and control device 19 as well as the design of the suction bars 12 and 16 do not belong to the subject matter of the present application. They can be realized as required by means known from the prior art.

The device functions as follows: The cassette 14 which is to be loaded and unloaded respectively is slid into the cassette unloading and reloading station 13 in the direction of the arrow "A" and transported by transport belt 15 up to an end abutment. As soon as it has reached its end position, cover 14a of cassette 14 is opened by means not illustrated.

By means of the suction bar 16, which is subjected to a vacuum by the operation of a vacuum pump, the exposed sheet film 3 is seized and fed to the transport rollers 17. These rollers transport the exposed sheet film to the transport rollers 18 and subsequently in the direction of the arrow "B" to a light-tight film developing apparatus connected to the device.

Depending on the size (sheet-film format) of the inserted cassette 14, which is sensed in the unloading and reloading station 13 by known means not illustrated, the sheet-removal device 10, 12 which is adjacent to the supply magazine 2 containing the sheet-film format sensed is activated.

At he same time, conveyor belt 8 is driven in the direction of the arrow "E", cover 2a of the supply magazine 2 is partially opened, suction bar 12 operated and the transport rollers 10 are driven.

Suction bar 12 is moved from its initial position shown in dash-dotted lines to a position above the open area of supply magazine 2 where it is lowered to seize a sheet film 3 in that it is subjected to a vacuum applied by the actuation of the vacuum pump; by reversal of the direction of movement, suction bar 12 lifts the sheet film 3 thus separated and transfers it to the transport rollers 10. As soon as sheet film 3 has been engaged by the transport rollers 10, suction bar 12 is ventilated and the sheet film 3 released by it.

The transport rollers 10 transport the separated sheet film 3 through the channel formed by guide elements 11 onto the conveyor belt 8. As soon as sheet film 3 has left the transport rollers 10 its slip downwardly by a small distance until it makes contact with the nearest projection 9 of conveyor belt 8.

Conveyor belt 8 moves the sheet film 3 downwardly to the cassette unloading and reloading station 13. As soon as the projections 9 holding the sheet film 3 pivot about the lowermost roller 7 out of the plane of the sheet film, sheet film 3 is released.

The sheet film 3 thus released then slides into the open cassette 14.

In order to make sure that sheet film 3 is properly positioned in cassette 14 and does not partially rest on the front edge of the cassette, sheet film 3 is shifted by suction bar 16 into its left end position. For this purpose, suction bar 16 is moved from its retracted initial position towards the left, after sheet film 3 has slid into its lowermost position, and is lowered in its position above the cassette 14 onto sheet film 3 and shifted to its left abutment position in cassette 14 by suction bar 16 to which a vacuum is applied.

Subsequently suction bar 16 is ventilated and returned to its retracted initial position to the right.

After sheet film 3 has been properly positioned, cassette 14 is closed and then dispensed from device 1 by the transport belt 15 in opposition to the direction of the arrow "A".

In contrast to the embodiment described, the projections 9 may also have other shapes and arrangements and be disposed at smaller or larger distances "D", depending on the purpose for which they are intended.

The conveyor belt 8 may also be designed as a suction belt (without projections 9) of a known construction not illustrated, said suction belt transporting the sheet film 3 to the cassette unloading and reloading station 13. By ventilating a suction device of a type known per se which is connected with a suction belt, sheet film 3 is released to slide into the open cassette 14.

It is also possible for the exposed sheet film 3 to be fed out in the direction of the arrow "C" if the film developing apparatus is arranged below the film loading device 1.

I claim:

1. In a device for loading a sheet film into a cassette and comprising a cassette-loading station, at least two supply magazines each of differently sized sheet film disposed above said station, a conveyor belt disposed to one side of said magazines, and means disposed between said magazines and said conveyor belt for moving a sheet film from a side of its respective magazine onto said conveyor belt;

the improvement wherein said magazines are disposed one above the other so that their removal sides are offset from a vertical line, one to the other, and wherein said conveyor belt is disposed adjacent said removal sides so it is inclined from the vertical by the amount of said offset, and includes a projection positioned to catch an edge of a sheet film moved from its magazine, whereby sheet film from said magazines is carried by the conveyor belt rather than by gravity, in a non-vertical direction.

2. A device as defined in claim 1, wherein a plurality of said projections are spaced along said conveyor belt in the direction of movement of said belt, the spacing of said projections in said direction being no closer than the length of the smallest of said differently-sized sheet films.

3. A device as defined in claim 1 or 2, wherein said moving means comprise a vacuum pick-up, a guide channel, and drive means for transferring a sheet from said vacuum pick-up to said guide channel.

* * * * *